(12) United States Patent
Fumarolo et al.

(10) Patent No.: US 6,366,782 B1
(45) Date of Patent: *Apr. 2, 2002

(54) METHOD AND APPARATUS FOR ALLOWING A USER OF A DISPLAY-BASED TERMINAL TO COMMUNICATE WITH COMMUNICATION UNITS IN A COMMUNICATION SYSTEM

(75) Inventors: Arthur L. Fumarolo, Schaumburg; Brett A. Jackson, Arlington Heights, both of IL (US)

(73) Assignee: Motorola, Inc., Schaumburg, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/415,297

(22) Filed: Oct. 8, 1999

(51) Int. Cl.[7] .................................................. H04Q 7/20
(52) U.S. Cl. ....................................... 455/457; 455/509
(58) Field of Search ................................ 455/456, 457, 455/404, 521, 520, 518, 519, 414, 557, 508, 509; 340/901, 904, 905, 988, 990, 989, 995, 286.01, 286.02, 286.06, 286.14, 825.49, 539, 457, 577, 329–332, 335, 969, 978; 379/45, 48, 49, 38; 701/708, 117, 342, 357.09, 357.1, 357.13, 357.07

(56) References Cited

U.S. PATENT DOCUMENTS 5,904,727 A * 5/1999 Prabhakaran ............... 701/208

* cited by examiner

Primary Examiner—Marsha D. Banks-Harold
(74) Attorney, Agent, or Firm—Susan L. Lukasik; Val Jean F. Hillman; Steven R. Santema

(57) ABSTRACT

A display-based terminal (101) employs a method and apparatus for allowing a user of the terminal to communicate with communication units (105–113) in a communication system (100). The terminal displays a map (300, 400) to the user indicating locations of communication units in at least a portion of the communication system. The terminal then receives a selection from the map of at least one communication unit (105, 108, 109, 113) and an indication (309, 311) of the user's desire to communicate with the selected communication unit. The indication of the user's desire to communicate may be contemporaneous with the user's selection of the communication unit, for example, when the user has, prior to such selection, indicated a desired type (302–305, 401–404) of communication and/or a desired transmission mode (406) for subsequent communications with the communication units. Responsive to receipt of the user's selection of the communication unit and indication of a desire to communicate, the terminal automatically initiates a communication with the selected communication unit.

41 Claims, 8 Drawing Sheets

METHOD AND APPARATUS FOR ALLOWING A USER OF A DISPLAY-BASED TERMINAL TO COMMUNICATE WITH COMMUNICATION UNITS IN A COMMUNICATION SYSTEM

FIELD OF THE INVENTION

The present invention relates generally to communication systems and, in particular, to a communication system that employs a method and apparatus for allowing a user of a display-based terminal to communicate with communication units in the communication system.

BACKGROUND OF THE INVENTION

Dispatch communication systems are known to include a wireless infrastructure and a plurality of communication units, such as two-way radios. Some dispatch systems, such as those used for public safety, also include a dispatch console and a so-called "computer aided dispatch (CAD) system" that includes a display-based terminal to control communications between the communication units. The CAD terminal typically displays categorized tables of information to the terminal user (typically referred to as a "dispatcher" or "dispatch operator"). For example, the CAD terminal may display queues of currently pending incidents and/or a list of communication units that are currently available. In addition, some CAD terminals include an integrated mapping program that enables the CAD terminal to display locations of communication units on a map that represents a geographic area supported by the dispatch system. The locations of the communication units are typically provided to the CAD system on a periodic basis by an automatic vehicle location (AVL) system that is coupled to the CAD system via a dedicated communication link.

In addition to receiving communication unit location information, the CAD system may also receive incident information from a 911 system that is coupled to the CAD system. In such a case, the map displays the origination point of a 911 telephone call to the dispatcher as an icon on the map. By viewing communication unit location, communication unit status, and incident location on the map, the dispatcher can quickly determine which communication unit users (e.g., policemen, firemen, paramedics, and so forth) would be in the best situation to respond to the incident. As an incident is attended to by users of the communication units, the status of the communication units associated with such users is updated either manually by the dispatcher or automatically by the CAD system responsive to messaging from the wireless infrastructure. In the latter case, the wireless infrastructure receives status updates over a wireless communication channel from the communication units that are participating in the handling of the incident. Changes in communication unit status are typically indicated to the dispatcher by some type of visual change, such as a color change or icon update, to the participating unit's representation on the map.

A map display, with icons representing the incidents and the communication units with their current status, gives a dispatcher a powerful tool for quickly evaluating an emergency situation. By using standard graphical user interface (GUI) cursor interaction (e.g., point and click or drag and drop), the dispatcher can manipulate the screen icons to assign units to incidents. In some systems, the action of assigning communication units to incidents on the map automatically sends data to the assigned communication units (e.g., if the units are equipped with mobile data terminals) to enable the communication unit users to immediately obtain critical information related to the incident, such as the incident location and other details.

In many situations, the assignment of a communication unit to an incident is followed by a voice conversation between the dispatcher and the user of the communication unit. Such a voice conversation enables the dispatcher and the communication unit user to discuss additional details about the incident which may not have been automatically relayed via data messaging. Voice communication during the handling of an incident is critical because it provides the communication unit users with real-time updates of the situation and the parties involved as the incident progresses.

Although the aforementioned voice communication between the dispatcher and the assigned communication unit users is critical, such voice communication cannot be initiated from the map environment with prior art CAD systems or terminals. Rather, in existing systems, the dispatcher must access a separate dispatch console program (which may be displayed on the CAD terminal in a different environment from the map) to control the voice communication with the communication unit users, thereby losing the benefit of viewing the overall picture of the incident as provided by the map.

One conventional dispatch system is currently being developed for a municipal transit authority, but as yet has not been implemented, in an attempt to integrate voice control into the CAD terminal map display. In this proposed system, which will include a first map displaying a subway system and a second, separate map displaying train locations, the dispatcher will be able to select a section of the subway from the first map and automatically initiate a voice call to all trains in the selected area of the subway only. As noted above, the first map display does not, however, include the locations of the trains. Therefore, the dispatcher cannot select particular trains individually or as a group to communicate with. Moreover, the proposed system does not facilitate trunked communications and does not take into account various communication parameters, such as private line, digital private line, encryption, and others. Therefore, although this proposed system may allow initiation of voice calls to a geographic area depicted on the first map, the system does not insure that any communication will actually occur because the dispatcher will not know from the first map display whether or not trains are in the selected area of the subway and the dispatcher cannot select the trains themselves, either individually or in a group, to communicate with from either map display. Consequently, although the proposed dispatch system does suggest a type of map-based voice dispatch, it has many practical shortcomings.

Therefore, a need exists for a method and apparatus that allows a user of a display-based terminal, such as a CAD terminal, having an integrated mapping program to communicate directly with communication units from a single map environment.

DETAILED DESCRIPTION OF A PREFERRED EMBODIMENT

Generally, the present invention encompasses a method and apparatus for allowing a user of a display-based terminal to communicate with communication units in a communication system. The terminal displays a map to the user indicating locations of communication units in at least a portion of the communication system. The terminal then receives a selection from the map (e.g., through the use of a selection device, such as a mouse or a touchscreen) of at least one communication unit and an indication of the user's desire to communicate with the selected communication unit or units. The indication of the user's desire to communicate may be contemporaneous with the user's selection of the communication unit or units, for example, when the user has, prior to such selection, indicated a desired type of communication (e.g., group or individual) and/or a desired transmission mode (e.g., analog, digital, trunked, conventional, encrypted, unencrypted, simplex, full duplex, half duplex, and so forth) for subsequent communications with the communication units. Responsive to receipt of the user's selection of a communication unit or units and indication of a desire to communicate, the terminal automatically initiates a communication with the selected communication unit or units. By allowing the terminal user to communicate with communication units in this manner, the present invention incorporates the user's ability to communicate with the communication units directly into the map display, in contrast to prior art computer-aided dispatch approaches that require the user to first determine from the map which communication unit or units to communicate with and then use external call set-up procedures or another map to actually initiate the communication. The present invention links the communication set-up procedures with the map display to enable the terminal user to simply "point and click" (or the equivalent) to quickly communicate with any particular communication unit or units being monitored by the user.

Figure 1:
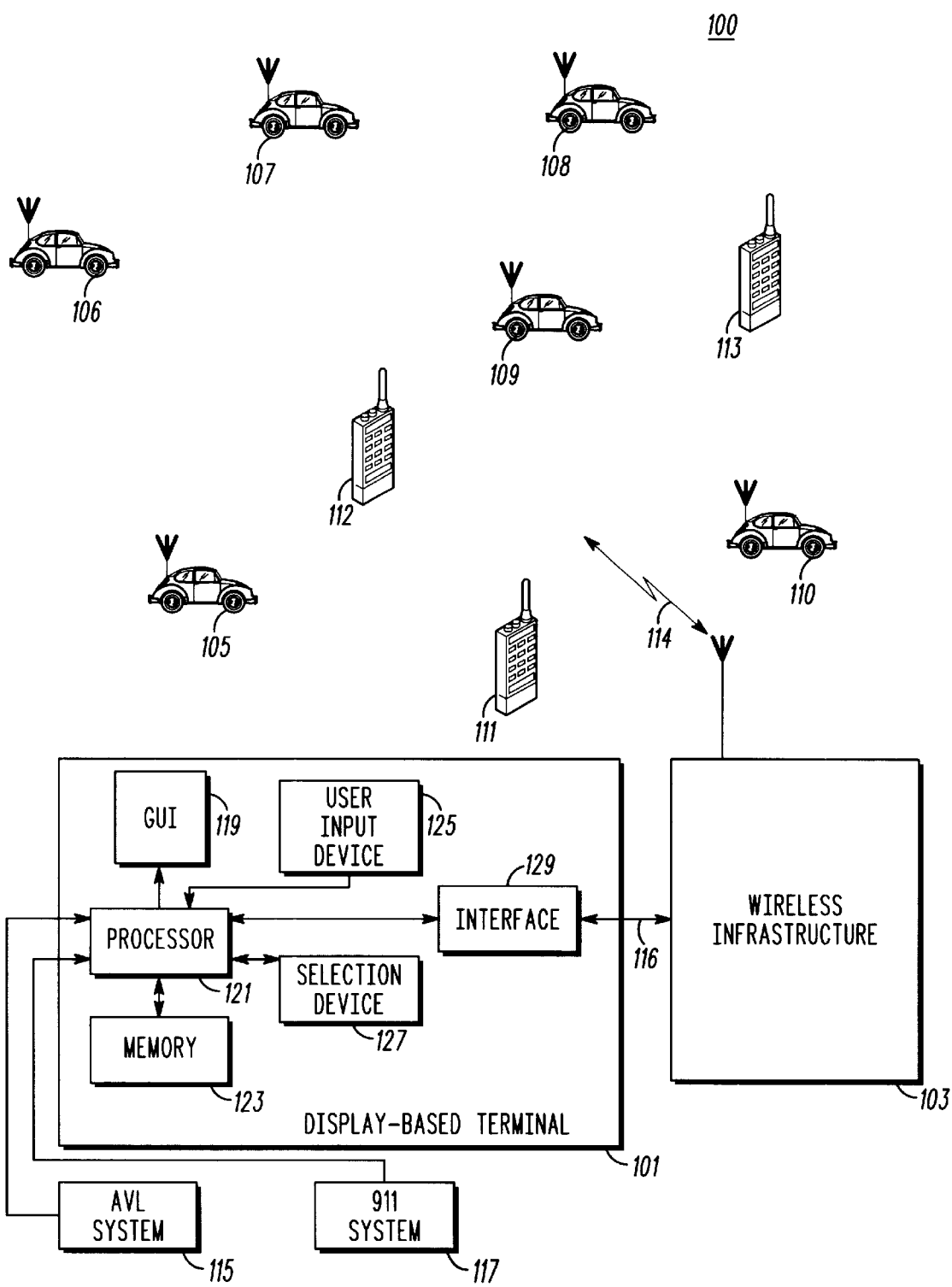
FIG. 1 illustrates a block diagram of a communication system in accordance with a preferred embodiment of the present invention.

The present invention can be more fully understood with reference to FIGS. 1–7, in which like reference numerals designate like items. FIG. 1 illustrates a block diagram of a communication system 100 in accordance with a preferred embodiment of the present invention. The communication system 100 includes a display-based terminal 101, a wireless infrastructure 103, and a plurality of communication units 105–113 that communicate with the wireless infrastructure 103 over one or more communication resources 114 (one shown). The communication system 100 may be either a conventional system or a trunked system and each communication resource 114 may comprise a frequency carrier, one or more time slots of a frequency carrier, or an orthogonal code implemented by a respective frequency hopping pattern or by a pseudo-random noise sequence spread over a wide bandwidth (e.g., 3 MHz).

The communication units 105–113 comprise two-way mobile radios, two-way portable radios, or two-way wireless data terminals. As depicted in FIG. 1, the communication units 105–113 preferably comprise a combination of mobile radios, portable radios, and wireless data terminals. The wireless infrastructure 103 supports the particular communication system 100 and, therefore, comprises one or more base stations (e.g., in a conventional system) or one or more base stations and one or more system controllers (e.g., in a trunking system). The wireless infrastructure 103 is coupled to the display-based terminal 101 via one or more communication links 116 (one shown), such as broadband leased telephone lines (e.g., T1 or T3 lines), standard telephone lines, coaxial cable, fiber optic cable, or microwave links when the terminal 101 is located a substantial distance from the wireless infrastructure 103 or an RS232 cable or standard telephone lines when the terminal 101 is collocated with the wireless infrastructure 103.

In the preferred embodiment, the display-based terminal 101 is a fixed computer-aided dispatch (CAD) terminal that is coupled to an automated vehicle location (AVL) system 115 and an emergency 911 system 117. The AVL system 115 and the 911 system 117 are well known; thus, no further discussion of them will be presented except to facilitate an understanding of the present invention. The display-based terminal 101 preferably includes a graphical user interface (GUI) 119, a processor 121, a memory 123, a user input device 125, a selection device 127, and an interface 129 to the wireless infrastructure 103. The interface 129 corresponds to the particular type of communication link 116 between the terminal 101 and the wireless infrastructure 103 and may comprise a radio frequency (RF) modem or a wireline modem to couple the processor 121 to the wireless infrastructure 103.

The GUI 119 is well known and, responsive to the processor 121, presents the user of the terminal 101 with a map display of geographic locations of communication units 105–113 in at least a portion of the communication system 100. The processor 121 preferably comprises a microprocessor and a digital signal processor for controlling the various elements of the terminal 101 and for communicating with the wireless infrastructure 103. The user input device 125 preferably comprises a foot switch, a panel microphone, a push-to-talk (PTT) activator, a computer mouse, a keyboard, a touchscreen portion of the GUI 119, a voice activated device, a voice recognition device, or some combination thereof to enable the user of the terminal 101 to input user information for transmission to one or more of the communication units 105–113. The memory 123 preferably comprises a combination of random access memory (RAM), read only memory (ROM), programmable read only memory (PROM), and a floppy disk to store software algorithms and data, such as communication information, used by the processor 121 during operation of the terminal 101. Finally, the selection device 127 preferably comprises a computer mouse or equivalent (e.g., trackball or touchpad), a keyboard, a touchscreen portion of the GUI 119, a voice recognition device, a voice activated device or some combination thereof to enable the user of the terminal 101 to make selections from the map displayed on the GUI 119.

Figure 2:
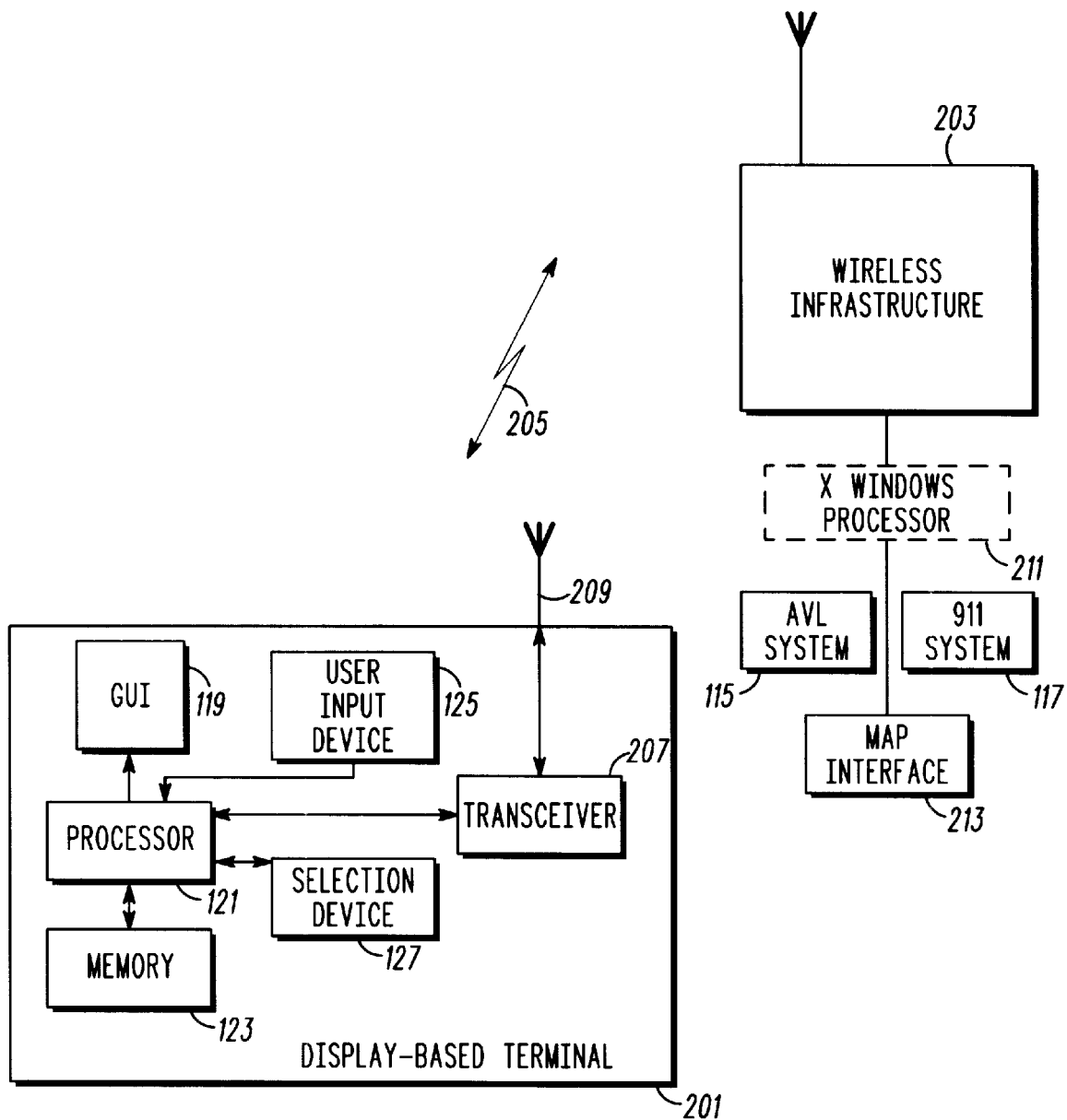
FIG. 2 illustrates a block diagram of a communication system, less communication units, in accordance with an alternative embodiment of the present invention.

In an alternative embodiment, as depicted in FIG. 2, the display-based terminal 201 is a remote terminal (e.g., a mobile dispatch or dummy terminal positioned in the geographic area of an emergency) that is not coupled directly to the AVL system 115 and the 911 system 117. In this embodiment, the display-based terminal 201 includes a radio transceiver 207 coupled to the processor 121 and an antenna 209 coupled to the radio transceiver 207 to enable the terminal 201 to exchange information with the wireless infrastructure 203 via an RF channel 205. In addition, in this embodiment, the AVL system 115, the 911 system 117, and a map interface 213 are coupled to the wireless infrastructure 203 either directly or indirectly, for example, via a processor, such as an X Windows processor 211 (shown in dash). In this embodiment, the terminal 201 receives communication unit location updates from the AVL system 115 and incident location information from the 911 system 117 via the wireless infrastructure 203 over the RF channel 205. In addition, in this embodiment, the terminal 201 can remotely monitor and control communications among the communication units 105–113 in a manner similar to terminal 101 through exchanges of information with the wireless infrastructure 203 over the RF channel 205.

Figure 3:
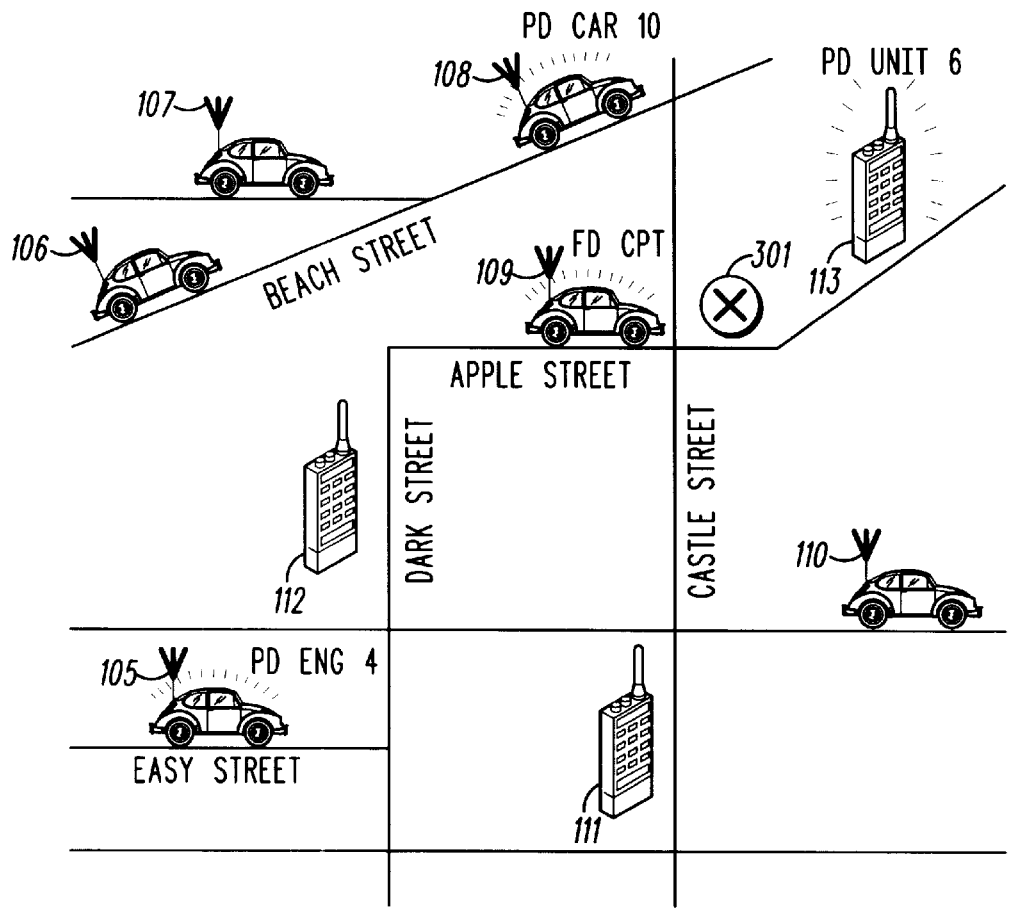
FIG. 3 illustrates an exemplary map displayed to a user of a display-based terminal in accordance with the present invention.
Figure 3:
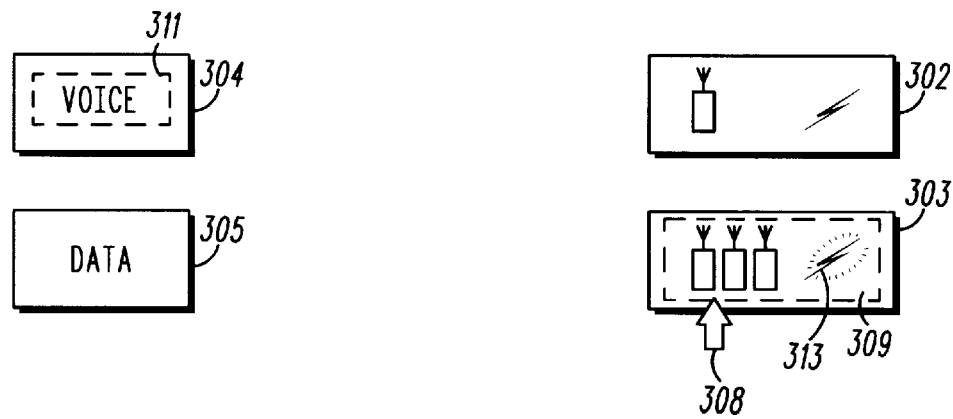
Figure 4:
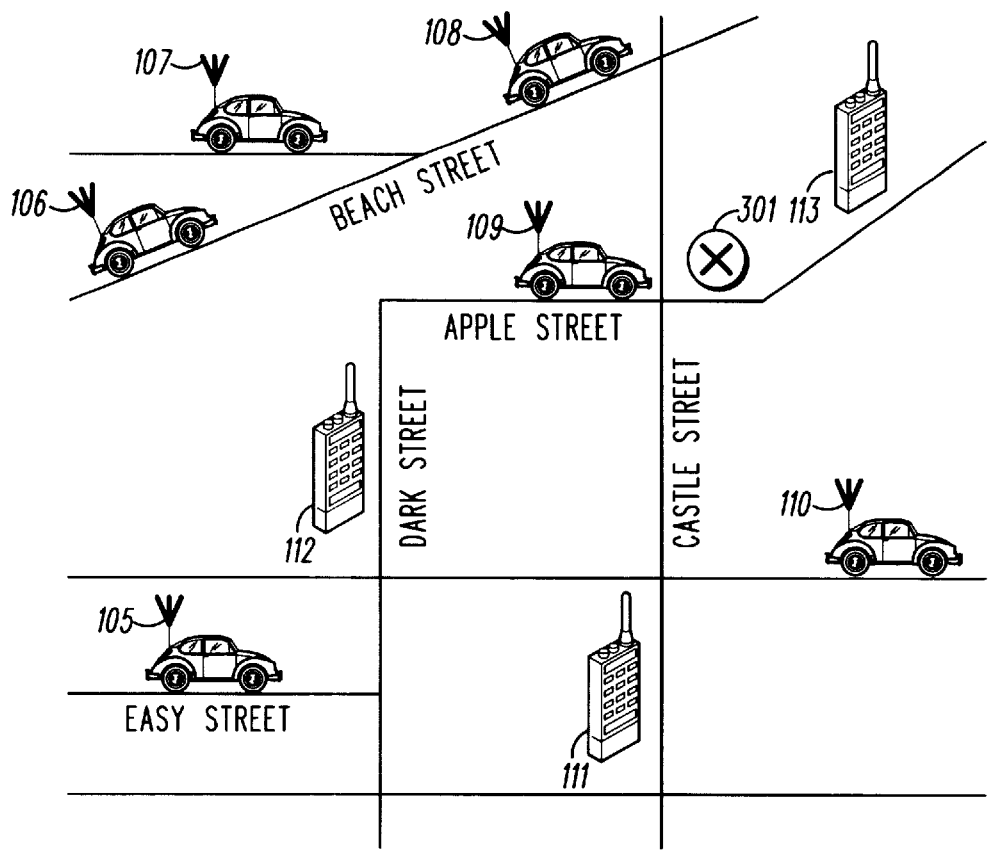
FIG. 4 illustrates the map of FIG. 3 with an alternative arrangement of buttons to select the communication type and transmission mode in accordance with the present invention.
Figure 4:
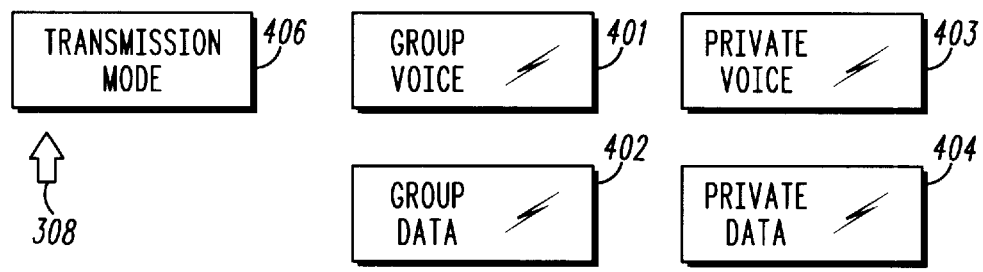

FIGS. 3 and 4 illustrate exemplary maps 300, 400 displayed to a user of the display-based terminal 101, 201 in accordance with the present invention. As shown in both FIGS., the map 300, 400 preferably depicts representations of the communication units 105–113 positioned on and off streets in a geographic area of the communication system 100. In addition, map 300 also preferably displays the identities of the users of the communication units 105–113 (e.g., Fire Department Engine 4 ("FD ENG 4"), Fire Department Captain ("FD CPT"), Police Department Car 10 ("PD CAR 10") and Police Department Unit 6 ("PD UNIT 6")) and the names of the streets. Only some exemplary street names and communication unit user identities are shown in FIG. 3 for the sake of clarity. The map 300, 400 may further indicate (e.g., below the representation of the respective communication unit 105–113 or through the use of a color coding scheme for each communication unit representation) the status of each communication unit 105–113 (e.g., active, inactive, off-duty, busy, assigned to an incident, and so forth). In addition, the map 300, 400 preferably displays the location of an incident 301 that some of the communication units 105, 108, 109, 113 may be responding to if, for example, the communication system 100 is a city's or a county's emergency response system.

Besides depicting the locations of the communication units 105–113, the location of an incident 301, and various information about the communication units 105–113 or their users, the map 300, 400 also preferably displays various means for the user of the display-based terminal 101, 201 to select a communication type and/or a transmission mode for an upcoming communication with one or more of the communication units 105–113. For example, the map 300, 400 may include virtual buttons 302–305, 401–404 from which the user of the terminal 101, 201 can select the type of communication, such as an individual or private communication (button 302), a group communication (button 303), a voice communication (button 304), a data communication (button 305), or some combination thereof (e.g., as is exemplified in buttons 401–404 of FIG. 4). Voice and data buttons 304, 305 may be associated with respective graphical depictions of a microphone, a speaker, or some other item that indicates voice and a keyboard, a bit stream, a computer monitor, or some other item that indicates data, although such depictions are not shown in FIG. 3. In addition, as depicted in FIG. 4, the map 300, 400 may include a virtual button 406 from which the user of the terminal 101, 201 can select the transmission mode for the communication, such as analog, digital, trunked, conventional, encrypted, unencrypted, private line (PL), digital private line (DPL), simplex, duplex, half-duplex, or various other known modes. For example, when the terminal user clicks on button 406, a list of permitted transmission modes may appear from which the user selects the desired mode. Alternatively, the map 300, 400 may include one or more pull-down menus that include the various types of communications and transmission modes that are permissible in the communication system 100.

To select a communication unit or communication units 105–113 for participation in the communication with the terminal user and to indicate a particular type of communication to be initiated, the user preferably uses a computer mouse to move a cursor 308 on top of the communication unit representation (e.g., 105) or on top of the button (e.g., 303) and depresses a physical button on the mouse to indicate a selection. For example, to indicate a desire to initiate a group call, the user might move the cursor 308 on top of the representation of communication unit 105 and depress the mouse button (i.e., "click"), thereby selecting unit 105 and all members of a previously established talkgroup that includes unit 105.

Alternatively, the user may use the mouse to individually select a group of units for participation in the group call by clicking the cursor 308 on each unit of the group one at a time. Further, the user may use the mouse to individually select multiple talkgroups for participation in the group call by clicking the cursor 308 on one unit of each talkgroup. For example, if communication units 105 and 109 are members of the fire department talkgroup and communication units 108 and 113 are members of the police department talkgroup, and the terminal user desires to initiate a group call that includes both the fire department talkgroup and the police department talkgroup, then the terminal user need only select one unit from each talkgroup (e.g., units 105 and 108) to select all units 105, 108, 109, 113 of both talkgroups for participation in the group call. Still further, the user may use a "click and drag" approach to select a group of communication units simultaneously. For example, the user may move the cursor 308 to a corner of an area of the map 300, depress the mouse button, and, while holding the mouse button depressed, drag the cursor 308 to an opposite corner of the desired area to display a rectangle, such that when the mouse button is released, all communication units having representations enclosed by the displayed rectangle are simultaneously selected for participation in the communication. Various other known techniques for creating shapes on a display can be used to simultaneously select a group of communication units (or groups of communication units when, for example, one or more of the selected units are members of respective talkgroups and a group communication is intended) for participation in the communication.

In the preferred embodiment, once one or more communication units 105, 108, 109, 113 are selected, the map 300 provides a unique visual indication on the map of the selected communication units 105, 108, 109, 113 to allow the user of the terminal 101 to easily differentiate selected communication units 105, 108, 109, 113 from unselected communication units 106, 107, 110–112. For example, the representations of the selected communication units 105, 108, 109, 113 may be illuminated (indicated in FIG. 3 by the dashed lines surrounding the representations of communication units 105, 108, 109, and 113) to differentiate them from the representations of the unselected communication units 106, 107, 110–112.

Upon completion of selecting the communication units 105, 108, 109, 113 to participate in the communication, the user may then select the type of communication. For example, to select a group voice communication, the user may move the cursor 308 on top of the group communication button 303 and click, thereby selecting a group communication. The user may then move the cursor 308 on top of the voice button 304 and click, thereby selecting a voice communication. To indicate to the user the type of communication selected, the map 300 preferably provides an indication 309, 311 in each selected button 303, 304 that makes the button 303, 304 appear as though it has been depressed. Various alternative embodiments may be employed to select the type of communication to be initiated. For example, the user may first select the voice button 304 and then the group button 303, the map 300 may include one button 401–404 for each type of communication as depicted in FIG. 4, the map 300 may include a pull down menu identifying the types of communications, or the map 300 may include a communication icon that, when selected by the user, opens to display the various types of communications that can be initiated in the communication system 100.

In an alternative embodiment, the user may first select the type of communication and/or a transmission mode, and then select the participating communication unit or units. For example, the user may select a group voice communication and then select the communication units to be included in the group communication. As discussed above, the user may select a group of communication units simply by selecting one communication unit of the group. For example, if communication units 105, 108, 109, and 113 all belong to a talkgroup (e.g., either originally or as a result of a dynamic regrouping in support of an emergency) and the terminal user has first selected a group voice communication, the user need only select one of the communication units (e.g., unit 105) of the talkgroup to select the entire talkgroup for participation in the group communication. Alternatively, the user may select the communication units or groups of communication units individually or collectively (e.g., by selecting a group of units simultaneously using a "click and drag" rectangling or boxing approach).

In yet another embodiment, the user's selection of a communication unit or units may be all that is necessary to initiate or begin a communication with the selected unit or units. In this case, the memory 123 of the terminal 101, 201 has stored therein default types of communications for respective communication units. For example, the default type of communication for communication unit 110 may be an individual data communication because communication unit 110 is the police chief's wireless data terminal. Accordingly, the user of the display-based terminal 101, 201 need only select communication unit 110 to select both the participating communication unit and the type of communication.

Besides selecting the type of communication prior to selection of the communication unit or units, the terminal user may also select the transmission mode for the communication. For example, if the communication is highly confidential, the user might select an encrypted transmission mode if the system 100 and the selected communication units support such encryption. Alternatively, if the selected communication units are dual-mode units that support both analog and digital communications, the terminal user may select either analog or digital for the transmission mode. Selection of transmission mode is preferably made by using a computer mouse to move the cursor 308 on top of a transmission mode button 406 as depicted in FIG. 4 and clicking the mouse button to select the transmission mode button 406. Upon receipt of an indication from the GUI 119 that the transmission mode button 406 has been selected, the processor 121 retrieves a list of permitted transmission modes from the memory 123 and instructs the GUI 119 to display the list to the terminal user. The terminal user then uses the mouse and cursor 308 to select the desired transmission mode from the list. Alternatively, the processor 121 may instruct the GUI 119 to display a button for each allowable transmission mode, for example, on the top, bottom, right-hand, or left-hand sides of the GUI display. If no transmission mode is selected, a default transmission mode (e.g., an analog, unencrypted, conventional, half-duplex mode) is used.

It should be noted that the above discussion relating to the cursor 308 refers, of course, to a selection device 127 that comprises a computer mouse, a trackball, a touchpad, or the equivalent. As discussed above with respect to FIG. 1, other selection devices 127 may be used and, in such cases, the selection process would conform to the particular selection device 127. For example, if the selection device 127 was a touchscreen, the user of the terminal 101 need only touch the screen in the area of the communication unit representation, the button 302–305, 401–404 associated with the type of communication, or the button 406 associated with a transmission mode to select such unit, communication type, or transmission mode. Alternatively, if the selection device 127 is a voice recognition device, the user need only verbally state the identity of the communication unit user (e.g., "POLICE CHIEF"), the desired type of communication (e.g., "PRIVATE CALL"), or the desired transmission mode (e.g., "DIGITAL ENCRYPTED") to thereby select such unit, communication type, or transmission mode.

Referring to FIGS. 1, 3, and 4, operation of the communication system 100 occurs substantially as follows in accordance with the present invention. The terminal's processor 121 receives location coordinates of the communication units 105–113 on a periodic basis from the AVL system 115, from the communication units 105–113 themselves, or from the wireless infrastructure 103 in accordance with known techniques. The processor 121, executing a program stored in the memory 123, instructs the GUI 119 to display the locations of the communication units 105–113 on the map 300 together with buttons 302–305, 401–404, 406, an icon, or a pull-down menu identifying the types of communications and/or the modes of transmission supported by the system 100. When the terminal is a CAD terminal of a public safety dispatch center, the processor 121 on occasion receives a location of an emergency incident 301 from the 911 system 117 and displays the location of the incident 301 on the map 300.

While the locations of the communication units 105–113 are displayed on the map 300, the user of the terminal 101 may desire to communicate with one or more of the communication units 105–113. For example, if there is an emergency incident 301 at the corner of Apple Street and Castle Street, the terminal user (e.g., dispatch operator) may desire to establish a group call with the communication units 105, 108, 109, 113 that are en route to the incident 301. In such a case, the terminal user uses the selection device 127 to select the participating communication units 105, 108, 109, 113, the type of communication, and/or the transmission mode. As discussed above, the user may first select the communication units 105, 108, 109, 113 (either individually or collectively) and then select the type of communication and/or the transmission mode, first select the type of communication and/or the transmission mode and then the communication units 105, 108, 109, 113, or simply select one of the communication units (e.g., unit 105) when the type of communication and the transmission mode for the selected communication unit have been pre-stored as defaults in the memory 123 of the terminal 101.

If the user selects the type of communication and then the communication units 105, 108, 109, 113, the selected type of communication preferably remains the type of communication for all subsequent communications with the terminal user until the terminal user selects another type of communication. For example, if the terminal user selects a group voice communication and then selects communication units 105, 108, 109, and 113 (e.g., by selecting one of the units 105, 108, 109, 113 when the units 105, 108, 109, 113 are members of a talkgroup), the user engages in a group voice call with the selected communication units 105, 108, 109, 113. If, after completion of the group call with communication units 105, 108, 109, and 113, the user selects another communication unit (e.g., unit 110), a group call is automatically initiated with the talkgroup that includes communication unit 110 because the call type had not been changed. Similarly, if the user selects the transmission mode for the communication prior to selecting the communication units 105, 108, 109, 113, the selected transmission mode preferably remains the transmission mode for all subsequent communications with the terminal user until the terminal user selects another mode of transmission.

The processor 121 receives or accepts the terminal user's selections from the selection device 127 in accordance with known techniques, automatically accesses the memory 123 to obtain stored communication information pertaining to the upcoming communication, and automatically initiates the selected type of communication with the selected communication unit or units 105, 108, 109, 113. That is, after receiving signaling from the selection device 127 indicating selection of the participating communication unit or units 105, 108, 109, 113, the desired type of communication, and/or the desired transmission mode, the processor 121 accesses the memory 123 to obtain information it needs to initiate the indicated type of communication with the selected communication unit or units 105, 108, 109, 113 in the particular communication system 100.

For example, if the terminal user selects an individual voice communication with communication unit 106 without selecting a transmission mode (i.e., using the default transmission mode) and the communication system 100 is a conventional system, the processor 121 retrieves the individual identification of communication unit 106, the identification of the communication resource 114 (e.g., transmit and receive carrier frequencies), and one or more base station identifications (depending on the system configuration or whether simulcast operation is necessary for the indicated communication) from the memory 123. Alternatively, if the terminal user selects a group voice communication with communication units 105, 108, 109, and 113 and an encrypted transmission mode, and the communication system 100 is a trunked system, the processor 121 retrieves from the memory 123 the talkgroup identification associated with the talkgroup that includes the selected communication units 105, 108, 109, 113 and an encryption key associated with the talkgroup, the system itself, or possibly both.

Therefore, the stored communication information includes individual identifications of communication units, talkgroup identifications, encryption keys, communication resource identifications, base station identifications, private line codes, digital private line codes, and any other information necessary for the processor 121 to communicate with the wireless infrastructure 103 in the processor's attempt to initiate a communication in the particular communication system 100. The stored communication information may also include the default type of communication and mode of transmission when the processor 121 is programmed to retrieve such default information from the memory 123 upon detection of a selected communication unit.

Once the processor 121 obtains the stored communication information necessary to initiate the indicated type of communication in the communication system 100, the processor 121 automatically accesses or otherwise opens a communication resource 114 in support of the communication. The actual process for accessing or otherwise opening a communication resource depends on the type of communication system. For example, for a voice communication in a conventional system, the processor 121 accesses a communication resource by sending control signals to the identified base station or base stations to allocate or key-up such station or stations for communications on transmit and receive carrier frequencies identified in the control signal. Alternatively, for a voice communication in a trunked system, the processor 121 sends a resource request message to the wireless infrastructure 103 indicating the target communication unit or talkgroup and, upon allocation of a communication resource by the wireless infrastructure 103, receives a resource grant message indicating such allocation. Accessing and opening of communication resources in conventional and trunked dispatch communication systems is well-known; thus no further discussion will be presented except to facilitate an understanding of the present invention.

In addition to accessing the communication resource 114, the processor 121 preferably activates the user input device 125 to enable the terminal user to input user information for transmission over the communication resource 114 to the participating communication unit or units 105, 108, 109, 113. Activation of the user input device 125 may be contemporaneous with or subsequent to the processor's accessing of the communication resource 114. In the preferred embodiment, the user input device 125 collectively comprises a microphone coupled to the terminal 101 and a computer mouse (which is also the preferred selection device 127). In the preferred embodiment, when utilizing a default transmission mode, the terminal user depresses the mouse button at appropriate locations on the GUI 119 to select the participating communication units 105, 108, 109, 113 and the type of communication and, upon selecting the latter of the participating communication units 105, 108, 109, 113 and the type of communication, keeps the mouse button depressed to open the microphone and a corresponding voice path to the communication resource 114. Releasing of the mouse button closes the microphone and ends the terminal user's push-to-talk. Subsequent depresses of the mouse button will continue the current communication if such subsequent depresses occur within a system-configured hang-time after an end of transmission of one of the participating communication units 105, 108, 109, 113. Therefore, in the preferred embodiment, a computer mouse serves as both the selection device 127 and part of the user input device 125.

To summarize, once the terminal user has selected enough information (e.g., participating units, type of communication, and/or transmission mode) to enable the processor 121 to initiate the selected communication, the processor 121 initiates the communication automatically, without further manual action by the terminal user, by preferably accessing a communication resource 114 and activating the user input device 125. Thus, the terminal user, upon making his or her selections, need only begin using the user input device 125 to engage in the communication.

Once the communication has been initiated, the terminal 101 preferably displays an indication to the user of such initiation of the communication. In the preferred embodiment, the processor 121 instructs the GUI 119 to provide a visual indication to the user that the communication resource 114 has been accessed and allocated to the communication. For example, as depicted in FIG. 3, the resource indicator 313 of the selected button 303 may be illuminated to signify that a communication resource has been allocated to, or opened in support of, the communication. Alternatively, virtual depression of the selected button 303 (as indicated by dashed box 309) may serve to visually indicate both selection of the type of communication and communication initiation.

After the communication has been initiated, the terminal user engages in the communication with the selected communication unit or units 105, 108, 109, 113. During the communication, a user of a participating communication unit 105, 108, 109, 113 may respond to the terminal user or a user of another one of the participating communication units 105, 108, 109, 113. In the preferred embodiment, the terminal 101 provides the user a visual indication on the map 300 of the communication unit that is presently transmitting. For example, the representation on the map 300 of the transmitting communication unit may flash or blink on and off to indicate that the unit is currently transmitting. To provide such an indication of the transmitting communication unit, the processor 121 receives a data message from the wireless infrastructure 103 indicating the identity of the transmitting communication unit. Upon receiving the message, the processor 121 instructs the GUI 119 to provide the visual indication of the transmitting unit to the terminal user (e.g., by instructing the GUI 119 to periodically display the representation of the transmitting unit at a rate that makes the representation appear as though its blinking).

After the terminal user has completed the entire communication, the terminal 101 receives or accepts an indication of the user's desire to terminate the communication. The termination indication may be active or passive. That is, the terminal user may actively instruct the terminal 101 to terminate the communication (e.g., by depressing a termination key on the keyboard, double-clicking a mouse button, or releasing an already depressed mouse button) or the terminal user may do nothing and allow the communication to automatically terminate due to the time-out of the system hang timer. Once the communication has been terminated, the processor 121 may automatically de-select the participating communication units 105, 108, 109, 113, the communication type (if selected), and the transmission mode (if selected), returning the communication unit representations to their non-illuminated states and the communication type and transmission mode buttons 303, 304, 401, 406 to their non-depressed states, or await input from the terminal user.

In addition to being applicable to the initiation of a communication, the present invention is applicable to intermediate messaging occurring during an ongoing communication. For example, a group communication may already be established among some of the communication units 105, 108, 109, 113 and may being monitored by the terminal user. As each communication unit 105, 108, 109, 113 is transmitting during the communication, the terminal 101 prefer-ably indicates the currently transmitting communication unit (e.g., unit 105) on the map 300, 400 as described above (e.g., by causing the representation of the transmitting unit 105 to blink or flash).

In addition to indicating the transmitting communication unit on the map 300, 400, the terminal processor 121 determines the type and transmission mode for the communication based on, inter alia, the parameters of the communication messages themselves (e.g., whether the target address is a talkgroup or an individual address) and the identity of the wireless infrastructure entity (e.g., base station or system controller) that forwarded the message to the terminal processor 121. If the terminal user desires to respond to a transmitting unit 105, the terminal user need only select the transmitting unit 105 from the map 300, 400 using the selection device 127 to initiate the response and enter user input using the automatically-activated user input device 125. Upon receiving the user input, the terminal 101 automatically sends the response to the transmitting unit 105 via the wireless infrastructure 103 preferably as the type, and in the transmission mode, of the message previously received from the transmitting unit 105. In this manner, the present invention permits the terminal user to participate in ongoing communications with the users of the communication units 105, 108, 109, 113 directly from the map environment.

As described above, the present invention provides a display-based terminal that enables a user of the terminal to easily communicate with communication units being monitored by the user. In contrast to prior art CAD systems that require multiple displays to enable the CAD terminal user to view communication unit locations, status information, and user identifications on a map and possibly initiate communication with units in a selected area of the system, the present invention enables the terminal user to directly select the units the user wants to communicate with, the type of communication, and the transmission mode for the communication all within a single map environment. Moreover, the present invention provides for automatic initiation of the communication with the selected communication units without requiring the terminal user to leave the single map environment, in sharp contrast to the proposed transit authority system that provides for automatic initiation of a communication to a selected area of the system, but requires the CAD terminal user to view a second map to determine whether or not any communication units are in the selected area. Furthermore, in contrast to the proposed transit authority system that provides for simultaneous communication with all communication units in a selected area of the system, the present invention provides the terminal user with considerably more communication flexibility by allowing the user to select groups of units or individual units to communicate with regardless of whether or not the units are in any particular area of the system.

Figure 5A:
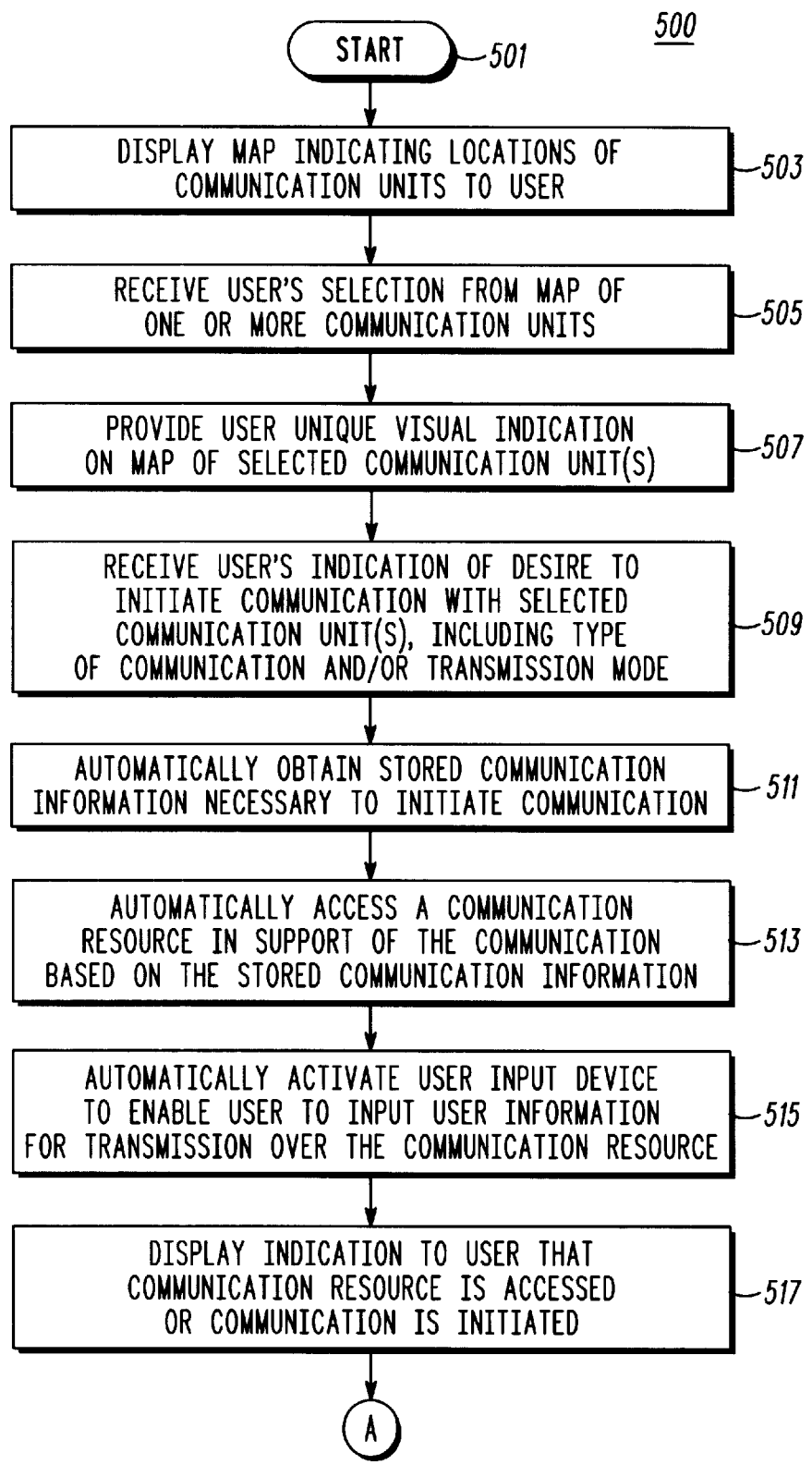
FIG. 5A and FIG. 5B illustrate a logic flow diagram of steps executed by a displayed-based terminal to communicate with at least one communication unit in accordance with a preferred embodiment of the present invention.
Figure 5B:
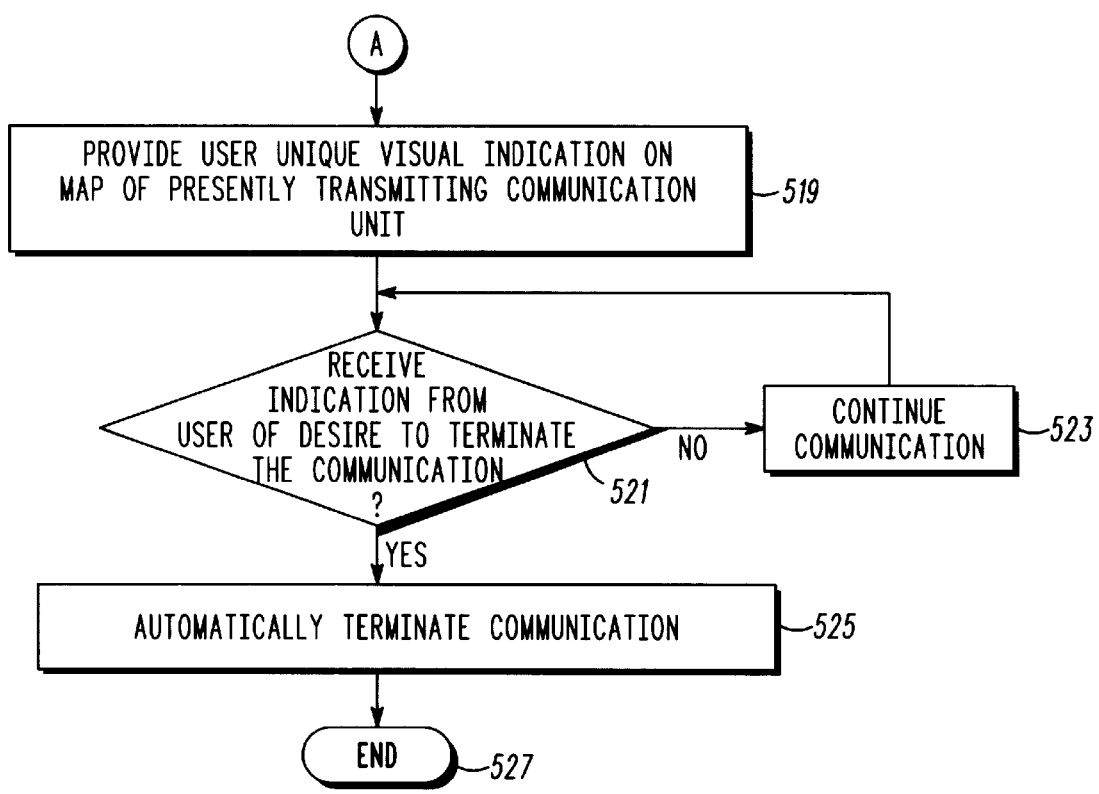

FIG. 5A and FIG. 5B illustrate a logic flow diagram 500 of steps executed by a displayed-based terminal to communicate with at least one communication unit in accordance with a preferred embodiment of the present invention. The logic flow begins 501 when the display-based terminal displays 503 a map to the terminal user indicating locations of communication units in at least a portion of a communication system. The terminal determines the locations of the communication units to be displayed by preferably receiving such locations from an AVL system coupled to either the terminal, as described above with respect to FIG. 1, or a wireless infrastructure that facilitates communication between the terminal and the communication units, as described above with respect to FIG. 2. Alternatively, the terminal may determine such locations from the communication units themselves (e.g., when the communication units include global positioning satellite (GPS) receivers or utilize some other known location-determining process, such as that described in U.S. Pat. No. 5,901,358, and transmit their locations to the terminal via the wireless infrastructure) or from the wireless infrastructure (e.g.,. when the wireless infrastructure utilizes known triangulation techniques to determine the locations of the communications units).

As discussed above with respect to FIG. 3, the map display preferably identifies the users of the communication units and their locations on a local street map. In addition, the map display also preferably includes means, such as virtual buttons or pull-down menus, for allowing the user of the terminal to select the type of communication to be engaged in and/or the transmission mode and to at least initiate the communication.

Some time after displaying the locations of the communication units, the terminal receives 505 or accepts the user's selection from the map of one or more communication units for participation in a communication with the user. As described above, the selection of the communication units may be performed on an individual basis or a group basis. Subsequent to selection of the communication units, the terminal provides 507 the terminal user with a unique visual indication on the map of the selected communication units. In the preferred embodiment, the unique visual indication is attained by illuminating the representations of the selected communication units on the map. Nevertheless, any other unique indication, such as change of color, placing a ring or other shape around the unit, blinking highlight, and so forth, may be used so long as the visual indication of the selected communication units is different than a visual indication of non-selected communication units.

After receiving the communication unit selections, the terminal preferably receives 509 the user's indication of a desire to initiate or begin a communication with the selected communication units. In the preferred embodiment, this indication comprises receipt of the user's selection of the communication type and/or the transmission mode. That is, in the preferred embodiment, the terminal user first selects the participating communication unit or units and then selects the type of communication and/or the transmission mode. Since, in such a case, the terminal has all the information it needs to initiate a communication once the type of communication and the transmission mode are selected, the selection of the latter of the type of communication and the transmission mode also indicates the terminal user's desire to communicate with the previously selected communication units. In alternative embodiments, the type of communication and/or the transmission mode may be selected prior to selection of the communications units, in which case, selection of the communication unit or units also indicates the terminal user's desire to initiate the communication, or a separate indication of a desire to initiate the communication may be made (e.g., using a mouse button, a keyboard function key, or a voice queue) after selection of the communication unit or units, the type of communication, and the transmission mode. In yet another embodiment, selection of the communication unit or units may be all that is necessary to indicate the user's desire to initiate the communication when the terminal is programmed to use a default communication type and a default transmission mode for communications with the selected unit or units.

Once the terminal receives the user's indication of a desire to initiate a communication, the terminal automatically obtains 511 stored communication information necessary to initiate the selected type of communication. As described above, there are preferably four general types of communication: individual voice communication, individual data communication, group voice communication, and group data communication. In addition, there are various transmission modes, such as analog, digital, encrypted, unencrypted, full duplex, half duplex, simplex, and others. Furthermore, there are various system configurations, such as trunked, conventional, secure, or a combination thereof. Therefore, in this step, the terminal processor retrieves from memory pre-stored information that must be provided to the system's wireless infrastructure and used by the terminal during the communication. Such pre-stored communication information includes, but is not limited to, individual communication unit identifications, talkgroup identifications, encryption keys, private line codes, communication resource identifications, base station identifications, and transmission mode parameters.

Once the appropriate pre-stored communication information is obtained, the terminal automatically accesses or opens 513 a communication resource in support of the communication based on the stored communication information and the system configuration. For example, if the desired communication is a group communication in a trunked dispatch system, the terminal sends a channel request message to the wireless infrastructure, wherein the channel request message includes the stored talkgroup identification of the target talkgroup. Responsive to the request, the wireless infrastructure sends the terminal a channel grant that includes the identification of the communication resource that has been allocated in support of the communication, thereby completing the terminal's communication resource access procedure. Alternatively, if the desired communication is an individual communication in a secure, conventional dispatch system, the terminal sends the wireless infrastructure the stored individual identification of the target communication unit, the stored encryption key for the system, the stored transmit and receive carrier frequencies (or only one of the carrier frequencies if the system uses a fixed frequency separation between transmit and receive frequencies), and the stored base station identification (or identifications, for example, if simulcast is desired).

In addition to automatically accessing or opening a communication resource, the terminal automatically activates 515 a user input device to enable the terminal user to input user information for transmission over the accessed communication resource. The user input device may comprise a combination of devices (such as the combination of a computer mouse and a microphone or the combination of a foot switch and a microphone) or a single device (such as a panel microphone or a voice activated device). The user input device is preferably activated either contemporaneous with or subsequent to the terminal's access of the communication resource.

After the communication resource has been accessed, the terminal preferably displays 517 an indication to the user of the terminal that such access has taken place or that the communication has at least been initiated. In the preferred embodiment, the indication is a visual indication, such as the illumination of a resource icon or a color modification of a resource icon. Alternatively, the indication may be audible, for example, if the terminal includes a speech synthesizer and a stored resource access message.

During the resulting communication over the communication resource, the terminal provides 519 the terminal user a unique visual indication on the map of the presently transmitting communication unit. For example, the terminal may display the representation of the transmitting unit as a blinking representation, may alter the size or color of the representation of the transmitting unit, or may display a special transmitting representation of the transmitting unit that is different than the unit's non-transmitting representation.

Additionally, during the communication, the terminal continually determines 521 whether it has received an indication from the terminal user of a desire to terminate the communication. The termination indication may be express (e.g., release of a depressed mouse button or receipt of some other signal from the user input device indicating an end of call) or implied (e.g., failure of the terminal user to respond to a communication unit within the system hang-time). If a termination indication has not been received, the terminal continues 523 the communication and monitors for the terminal user's desire to terminate the communication. If a termination indication has been received, the terminal automatically terminates 525 the communication, and the logic flow ends 527. To terminate the communication, the terminal sends appropriate messaging to the wireless infrastructure indicating an end of communication. For example, in a conventional system, the terminal might send a message instructing the base station or base stations supporting the communication to de-key, thereby de-allocating the communication resource. Alternatively, in a trunked system, the terminal might send a channel de-allocation request to a system controller of the wireless infrastructure, in response to which, the system controller would proceed with de-allocating the communication resource.

Figure 6:
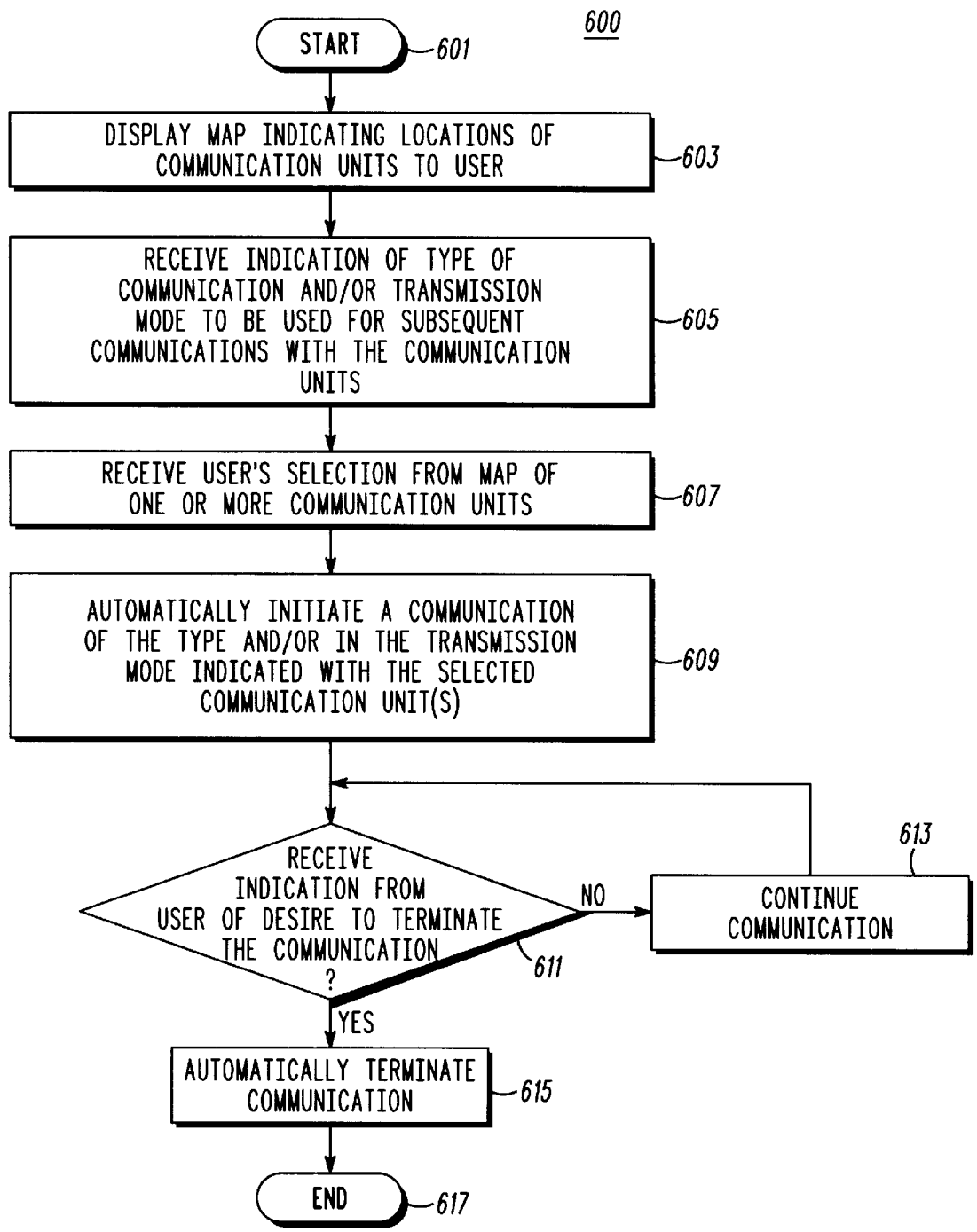
FIG. 6 illustrates a logic flow diagram of steps executed by a displayed-based terminal to communicate with at least one communication unit in accordance with an alternative embodiment of the present invention.

FIG. 6 illustrates a logic flow diagram 600 of steps executed by a displayed-based terminal to communicate with at least one communication unit in accordance with an alternative embodiment of the present invention. The logic flow begins 601 when the terminal displays 603 a map to the terminal user indicating locations of communication units in a geographic area of a wireless communication system. The map preferably depicts representations of the communication units in a street-map format and includes user identification (e.g., police chief or squad 51) and unit status information (e.g., off-duty, on-duty, assigned to incident, busy, and so forth) for each unit representation. Subsequent to displaying the map to the terminal user, the terminal receives 605 an indication from the terminal user of the type of communication and/or transmission mode to be used for subsequent communications with the communication units. As discussed above With respect to FIGS. 3 and 4, the indication may be made by using a selection device, such as a computer mouse, a keyboard, a touchscreen portion of the map, or a voice recognition device, to select one or more pull-down menus or virtual buttons that identify types of communications (e.g., group, individual, data, and/or voice) and modes of transmission.

Some time after receiving the user's indication of communication type and/or transmission mode, the terminal receives 607 the terminal user's selection from the map of one or more communication units with which the user desires to communicate. The selection is preferably made using the aforementioned selection device. Upon receiving the user's communication unit selection or selections from the map, the terminal automatically initiates 609 a communication of the type and in the transmission mode previously indicated with the selected communication unit or units. As discussed above, the process of initiating the communication preferably comprises retrieving communication information from memory related to the participating communication unit or units and the wireless system in which the terminal desires to communicate, accessing or opening a communication resource in accordance with wireless system protocols, and activating a user input device, such as a panel microphone, a PTT activator, a keyboard, or a voice activated device, to enable the terminal user to convey user information to the participating communication unit or units over the communication resource.

During the communication between the terminal user and the participating communication units, the terminal continually determines 611 whether it has received an indication from the user of the user's desire to terminate the communication. Such an indication may be express or implied as described above. If the terminal has not received such an indication, the terminal continues 613 the communication and monitors user inputs (or lack thereof in the case of termination due to a hang-time time-out) for such an indication. On the other hand, if the terminal has received such a termination indication from the user, the terminal automatically terminates 615 the communication (e.g., by de-allocating the communication resource or requesting resource de-allocation), and the logic flow ends 617.

Figure 7:
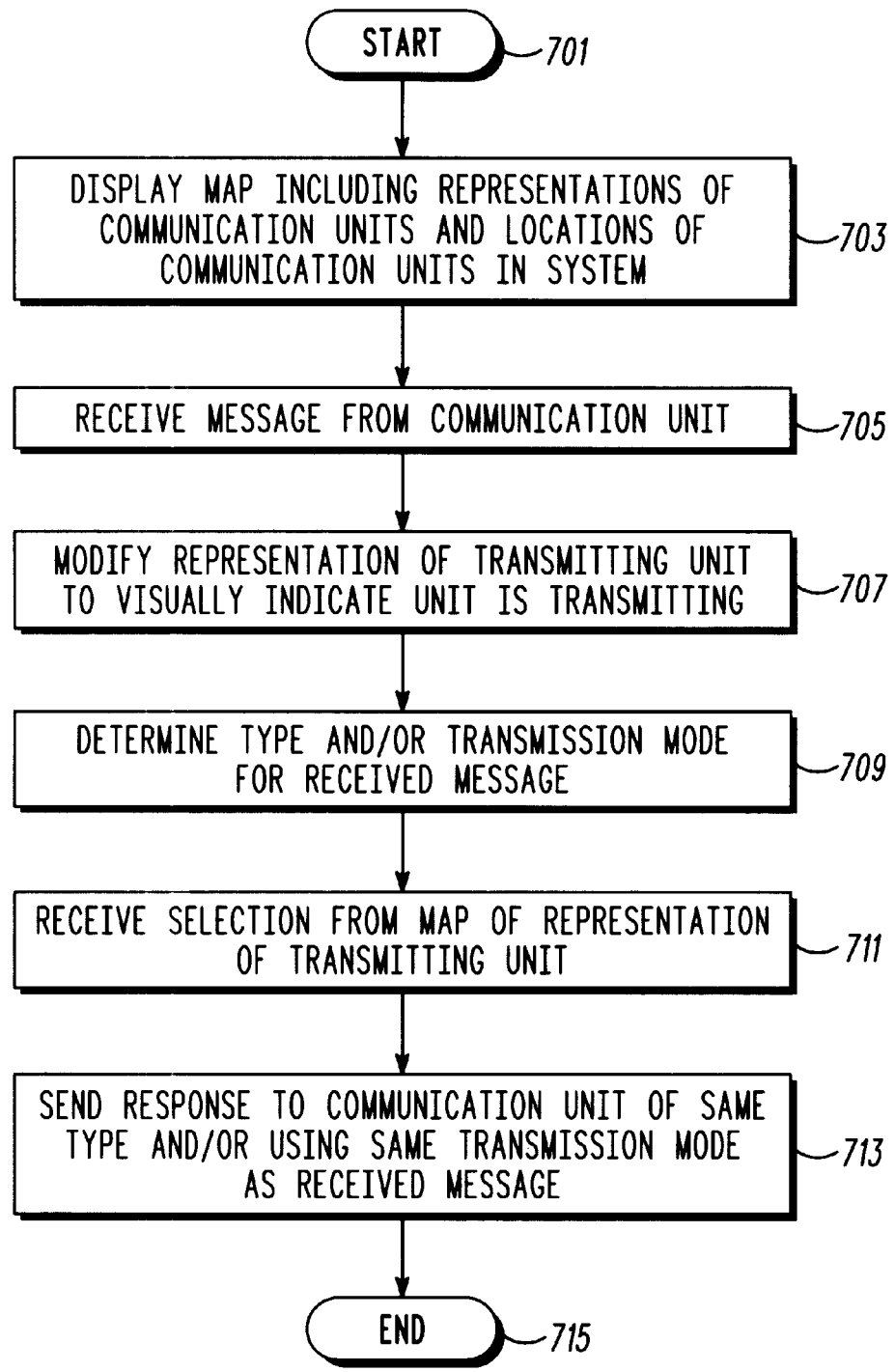
FIG. 7 illustrates a logic flow diagram of steps executed by a displayed-based terminal to communicate with at least one communication unit in accordance with yet another embodiment of the present invention.

FIG. 7 illustrates a logic flow diagram 700 of steps executed by a displayed-based terminal to communicate with at least one communication unit in accordance with yet another embodiment of the present invention. The logic flow begins 701 when the terminal displays 703 a map to the user, wherein the map includes representation (e.g., icons) of communication units and indicates the locations of the communication units in at least a portion of the communication system. Some time after displaying the map, the terminal receives 705, preferably via a wireless infrastructure of the communication system, a message (data or voice) from one of the communication units being monitored by the terminal user.

Upon receiving the message, the terminal determines which communication unit transmitted it. Such a determination is preferably made by processing a data message from the wireless infrastructure that includes the identification of the transmitting unit. The data message from the wireless infrastructure may precede or accompany the message from the communication unit. Having determined which communication unit is the transmitting communication unit, the terminal modifies 707 the representation of the transmitting unit on the map (e.g., by changing the representation's color, making the representation blink, or modifying the representation in any other unique manner) to visually identify the transmitting unit to the user of the terminal.

In addition to determining the identity of the transmitting communication unit, the terminal also processes the message received from the transmitting unit or some other data message received from the wireless infrastructure (e.g., the aforementioned data message that included the identification of the transmitting unit) to determine 709 the type and/or transmission mode for the received message. To determine the type of the communication (i.e., voice or data, group or private), the terminal preferably examines the data message from the wireless infrastructure to determine whether the message received from the transmitting unit is a voice call or a data message and examines the target address of the received message to determine whether the target address is a talkgroup or an individual identification of the terminal. To determine the transmission mode for the communication, the terminal preferably evaluates which device in the wireless infrastructure forwarded the message (receipt from a system controller would indicate a trunked mode; whereas, receipt from a base station would indicate conventional mode). In addition, the terminal preferably examines the content of the data message from the wireless infrastructure that accompanies or precedes the message from the transmitting communication unit to determine any other transmission mode parameters (e.g., whether or not the transmitting unit's message is encrypted, full-duplex, half-duplex, and so forth)

Some time after receiving the message from the transmitting unit, modifying the transmitting unit's representation on the map, and determining the type and/or transmission mode for the received message, the terminal receives 711 the terminal user's selection from the map of the transmitting unit's representation. In this embodiment, such selection provides an indication to the terminal that the terminal user desires to communicate with (in this case, respond to) the selected communication unit. Upon receiving the selection of the transmitting unit's representation, the terminal automatically accesses a communication resource (which may already be assigned to the two-way communication between the transmitting unit and the terminal) and activates a user input device (e.g., a microphone or a keyboard) to receive the user's response. Responsive to user input via the user input device, the terminal sends 713 the response to the transmitting communication unit (and possibly others if the original message type was a group call) using the identical type and transmission mode as the originally received message, and the logic flow ends 715.

The present invention encompasses a method and apparatus for allowing a user of a display-based terminal to communicate with communication units in a communication system through provision of an integrated dispatch system. With this invention, terminal users, such as dispatchers, can engage in communication with particular communication units by simply selecting the communication units (and possibly the type of communication and/or the transmission mode if a default type and/or mode are not used or if the communication is not a response to a previously received message) from the displayed map and using an automatically activated user input device to input user information. That is, with the present invention, once at least the participating communication units are selected by the user from the map, the terminal, through execution of software routines stored in memory, automatically initiates the selected communication without requiring the terminal user to leave the map environment. By contrast, prior art CAD map environments, although useful in many respects, do not enable the terminal user to remain in one map environment to both select participating units and initiate a communication with the selected units.

While the foregoing constitute certain preferred and alternative embodiments of the present invention, it is to be understood that the invention is not limited thereto and that in light of the present disclosure, various other embodiments will be apparent to persons skilled in the art. Accordingly, it is to be recognized that changes can be made without departing from the scope of the invention as particularly pointed out and distinctly claimed in the appended claims which shall be construed to encompass all legal equivalents thereof.

What is claimed is:

1. A method comprising the steps of
displaying a map of a geographic area on a display-based terminal, wherein the map contains a plurality of two-way communication units in their associated locations within the geographic area;
accepting, by the display-based terminal, a selection, from a user of the display based terminal, of at least one two-way communication unit of the plurality of two-way communication units from the displayed map;
accepting, by the display-based terminal, an indication of the user's desire to begin communication with the selected at least one two-way communication unit; and
without involving further manual action by the user:
automatically obtaining communication information necessary to begin the two-way communication; and
automatically, responsive to the step of obtaining communication information necessary to begin the two-way communication, opening a voice communication resource between the display-based terminal and the at least one two-way communication unit.

2. The method of claim 1, wherein the communication information comprises at least one of an individual identification, a talkgroup identification, an encryption key, a voice communication resource identification, a base station identification, a private line code, and a digital private line code.

3. The method of claim 1, further comprising the step of selecting a type of voice communication.

4. The method of claim 3, wherein subsequent communications are automatically of the type of voice communication selected in the step of selecting.

5. The method of claim 1, further comprising the step of providing a visual indication on the map of at least one two-way communication unit that is presently transmitting on any voice communication resource.

6. The method of claim 1, wherein the plurality of two-way communication units are in a voice communication system that includes a wireless infrastructure, wherein the wireless infrastructure includes at least one base station, and wherein the step of opening comprises the steps of:
keying up a base station of the wireless infrastructure; and
activating a user input device of the display-based terminal.

7. The method of claim 6, wherein the user input device is at least one of a foot switch, a panel microphone, a push-to-talk activator, a computer mouse, a keyboard, a touchscreen display, a voice recognition device, and a voice activated device.

8. The method of claim 1, further comprising the step of providing an indication on the display-based terminal that the voice communication resource is open.

9. The method of claim 1, further comprising the step of accepting, by the display-based terminal, an indication from the user of the user's desire to terminate a voice communication with the selected at least one two-way communication unit.

10. The method of claim 1, further comprising the step of providing a visual indication on the map of the selected at least one two-way communication unit, which visual indication is different than a visual indication for non-selected two-way communication units.

11. A method comprising the steps of:
displaying a map of a geographic area on a display based terminal, wherein the map contains a plurality of two-way communication unit's in their associated locations within the geographic area;
accepting, by the display based terminal, a transmission mode from the user of a display based terminal;
accepting, by the display based terminal, a selection, from the user of the display based terminal, of at least one two-way communication unit of the plurality of two-way communication units from the displayed map; and
without involving further manual action by the user:

automatically obtaining voice communication information necessary to begin voice communication in the transmission mode; and
automatically, responsive to the step of obtaining voice communication information necessary to begin voice communication in the transmission mode, opening a voice communication resource in the transmission mode between the display-based terminal and the at least one two-way communication unit.

12. The method of claim 11, further comprising the step of providing a visual indication on the map of the selected at least one two-way communication unit, which visual indication is different than a visual indication for non-selected two-way communication units.

13. The method of claim 11, wherein the communication information comprises at least one of an individual identification, a talkgroup identification, an encryption key, a voice communication resource identification, a base station identification, a private line code, and a digital private line code.

14. The method of claim 11, further comprising the step of selecting a type of voice communication.

15. The method of claim 14, wherein the type of voice communication includes at least one of an individual call, a group call, a data call, and a voice call.

16. The method of claim 11, wherein subsequent voice communications are automatically made using the transmission mode.

17. The method of claim 11, further comprising the step of providing a visual indication on the map of at least one two-way communication unit that is presently transmitting on any voice communication resource.

18. The method of claim 11, wherein the plurality of two-way communication units are in a voice communication system that includes a wireless infrastructure, wherein the wireless infrastructure includes at least one base station, and wherein the step of opening a voice communication resource comprises the steps of:
keying up a base station of the wireless infrastructure; and
activating a user input device of the display-based terminal.

19. The method of claim 18, wherein the user input device is at least one of a foot switch, a panel microphone, a push-to-talk activator, a computer mouse, a keyboard, a touchscreen display, a voice recognition device, and a voice activated device.

20. The method of claim 11, further comprising the step of providing an indication on the display-based terminal that the voice communication resource is open.

21. The method of claim 11, further comprising the step of accepting, by the display-based terminal, an indication from the user of the user's desire to terminate the voice communication with the selected at least one two-way communication unit.

22. A method for a display-based terminal to communicate with at least one of a plurality of two-way communication units in a communication system, the method comprising the steps of:
displaying a map to a user of the display based terminal indicating locations of the plurality of two-way communication units;
receiving, from the user, an indication of a type of communication to be used for subsequent communications with at least some communication units of the plurality of two-way communication units;
receiving, from the user, a selection from the map of at least one two-way communication unit of the at least some communication units to produce at least one selected communication unit; and
responsive to receiving the selection and without involving further manual action by the user:
automatically obtaining stored communication information necessary to at least initiate a voice communication of the type indicated in the indication; and
responsive to the step of obtaining stored communication information and without involving further manual action by the user:
automatically, initiating a voice communication of the type indicated in the indication with the at least one selected communication unit based on the stored communication information.

23. The method of claim 22, wherein the stored communication information includes at least one of an individual identification, a talkgroup identification, an encryption key, a voice communication resource identification, a base station identification, a private line code, and a digital private line code.

24. The method of claim 22, further comprising the step of providing a visual indication on the map of the at least one selected communication unit that is different than a visual indication of unselected two-way communication units.

25. The method of claim 22, further comprising the step of providing a visual indication on the map of a two-way communication unit of the at least one selected communication unit that is presently transmitting a voice communication.

26. The method of claim 22, wherein the type of voice communication comprises any one of an individual voice communication, an individual data communication, a group voice communication, and a group data communication.

27. The method of claim 22, wherein the step of automatically initiating a voice communication comprises the steps of:
accessing a voice communication resource in support of the voice communication; and
activating a user input device that enables the user to input user information for transmission over the voice communication resource.

28. The method of claim 27, wherein the user input device is at least one of a foot switch, a panel microphone, a push-to-talk activator, a computer mouse, a keyboard, a touchscreen display, a voice recognition device, and a voice activated device.

29. The method of claim 22, further comprising the step of displaying an indication to the user that the voice communication has been initiated.

30. The method of claim 22, further comprising the step of receiving an indication from the user of a desire to terminate the voice communication with the at least one selected communication unit.

31. A method for a display based terminal to communicate with at least one of a plurality of two-way communication units in a voice communication system, the method comprising the steps of:
displaying a map to a user of the display based terminal, the map including representations of the plurality of two-way communication units and indicating locations of the plurality of two way communication units within at least a portion of the voice communication system;
receiving a message from a transmitting communication unit of the plurality of two-way communication units;
modifying a representation of the transmitting communication unit to visually identify the transmitting communication unit to the user of the display-based terminal;

determining at least a type for the message received from the transmitting unit;

receiving, from the user of the display based terminal, a selection from the map of the representation of the transmitting communication unit; and responsive to user input without involving further manual action by the user:
  automatically obtaining communication information necessary to send a response to the transmitting communication unit;
  automatically, responsive to the step of obtaining communication information necessary to send a response, opening a voice communication resource between the display-based terminal and the transmitting communication unit; and
  sending a response to the transmitting two-way communication unit, wherein a type for the response is identical to the type for the message.

32. The method of claim 31, wherein the step of determining at least a type for the message further comprises determining a transmission mode for the message and wherein the step of sending a response further comprises the step of sending a response having a transmission mode that is identical to the transmission mode for the message.

33. A display-based terminal, comprising:
  a graphical user interface that displays, to a user of the display based terminal, a map indicating locations of a plurality of two-way wireless communication units;
  a selection device for use by the user of the display based terminal to select from the map at least one two-way wireless communication unit of the plurality of two-way wireless communication units with which the user desires to communicate to produce at least one selected communication unit;
  a memory device that has stored therein communication information necessary to at least initiate a voice communication with the at least one selected two-way communication unit; and
  a processor coupled to the graphical user interface, the memory device, and the selection device, the processor, responsive to the selection device and without further manual action by the user:
    automatically retrieving the communication information from the memory device,
    automatically opening a voice communication resource between the display-based terminal and the at least one two-way wireless communication unit, and
    automatically, at least initiating the voice communication with the at least one selected communication unit based on the communication information.

34. The display-based terminal of claim 33, wherein the communication information includes at least one of an individual identification, a talkgroup identification, an encryption key, a voice communication resource identification, a base station identification, a private line code, and a digital private line code.

35. The display-based terminal of claim 33, further comprising a user input device, coupled to the processor, that enables the user to input user information during the voice communication, wherein the user input device is at least one of a foot switch, a panel microphone, a push-to-talk activator, a computer mouse, a keyboard, a touchscreen display, a voice recognition device, and a voice activated device.

36. The display-based terminal of claim 33, wherein the selection device comprises at least one of a computer mouse, a keyboard, a touchscreen portion of the graphical user interface, a voice recognition device, and a voice activated device.

37. The display-based terminal of claim 33, wherein the display-based terminal is part of a voice communication system that includes a wireless infrastructure, wherein the display-based terminal is located remotely from the wireless infrastructure, and wherein the display-based terminal further comprises a radio transceiver, coupled to the processor, for exchanging voice and data information with the wireless infrastructure.

38. The display-based terminal of claim 33, wherein the map further indicates a location of at least one incident and a status of at least one of the plurality of two-way wireless communication units.

39. A voice communication system comprising:
  a plurality of wireless two-way communication units;
  a wireless infrastructure; and
  a display-based terminal, coupled to the wireless infrastructure and controlling voice communication between the plurality of two-way communication units, the display based terminal comprising;
    a graphical user interface that displays, to a user of the display-based terminal, a map indicating locations of the plurality of two-way wireless communication units;
    a selection device for use by the user of the display-based terminal to select from the map at least one two-way wireless communication unit of the plurality of two-way wireless communication units with which the user desires to communicate to produce at least one selected communication unit;
    a memory device that has stored therein communication information necessary to at least initiate a voice communication with the at least one selected communication unit; and
    a processor coupled to the graphical user interface, the memory device, and the selection device, the processor, responsive to the selection device and without involving further manual action by the user:
      automatically retrieving the communication information from the memory device,
      automatically opening a voice communication resource between the display-based terminal and the at least one selected communication unit, and
      automatically at least initiating the voice communication with the at least one selected communication unit through the wireless infrastructure based on the communication information.

40. The voice communication system of claim 39, wherein the display-based terminal is located remotely from the wireless infrastructure and wherein the display-based terminal further comprises a radio transceiver, coupled to the processor, for exchanging information with the wireless infrastructure.

41. The voice communication system of claim 39, wherein the display-based terminal further comprises a user input device, coupled to the processor, that enables the user to input user information during the voice communication.

* * * * *